(12) United States Patent
Tanabe

(10) Patent No.: US 7,347,464 B2
(45) Date of Patent: Mar. 25, 2008

(54) COLLISION DETECTION SYSTEM FOR VEHICLE

(75) Inventor: Takatoshi Tanabe, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 149 days.

(21) Appl. No.: 11/248,433

(22) Filed: Oct. 13, 2005

(65) Prior Publication Data
US 2006/0087132 A1    Apr. 27, 2006

(30) Foreign Application Priority Data
Oct. 21, 2004    (JP) .............................. 2004-307137

(51) Int. Cl.
*B60R 19/02*    (2006.01)
(52) U.S. Cl. ......................................... 293/4; 180/274
(58) Field of Classification Search ................ 293/117, 293/1, 2, 4, 120, 121; 180/271–289
See application file for complete search history.

(56) References Cited

U.S. PATENT DOCUMENTS 3,853,199 A * 12/1974 Hirashima et al. .......... 180/274
6,561,301 B1    5/2003 Hattori et al.
7,207,410 B2 *  4/2007 Song et al. .................. 180/274
2004/0129479 A1    7/2004 Ozaki
2005/0021192 A1    1/2005 Takafuji et al.
2005/0209754 A1    9/2005 Kiribayashi

FOREIGN PATENT DOCUMENTS

| JP | A-7-190732 | 7/1995 |
| JP | A-11-28994 | 2/1999 |
| JP | A-2004-156945 | 6/2004 |

\* cited by examiner

*Primary Examiner*—Dennis H. Pedder
*Assistant Examiner*—Melissa A Black
(74) *Attorney, Agent, or Firm*—Posz Law Group, PLC

(57) ABSTRACT

A collision detection system for a vehicle has two collision load sensors, which are respectively positioned between a rear end surface of a bumper reinforce member and front end surfaces of two side members of the vehicle. Thus, a collision load at any position in a vehicle-width direction of a bumper of the vehicle can be appropriately detected.

9 Claims, 6 Drawing Sheets

COLLISION DETECTION SYSTEM FOR VEHICLE

CROSS REFERENCE TO RELATED APPLICATION

This application is based on a Japanese Patent Application No. 2004-307137 filed on Oct. 21, 2004, the disclosure of which is incorporated herein by reference.

FIELD OF THE INVENTION

The present invention relates to a collision detection system for a vehicle. The collision detection system is suitably used to detect a collision load in a collision of the vehicle.

BACKGROUND OF THE INVENTION

Generally, a collision detection device can be provided for a vehicle to detect a collision with the vehicle. For example, referring to JP-2004-212281A, a wire having a predetermined initial tension is arranged at a front side of a bumper reinforce member of the vehicle and extends in a vehicle width direction. A collision load exerted at the vehicle can be determined, by a detection of the tension variation of the wire in the collision of the vehicle.

Moreover, referring to JP-2004-156945A, a pair of leads extending in the vehicle width direction is disposed at a front portion of the vehicle. The collision of the vehicle can be determined according to whether or not the leads contact each other due to the collision.

Furthermore, referring to JP-7-190732A, an optical leakage fiber extending in the vehicle width direction is arranged at the front bumper of the vehicle. A light-emitting unit and a light-receiving unit are respectively disposed at two ends of the optical leakage fiber. When the optical leakage fiber is deformed or broken due to the collision of the vehicle, the light-receiving amount of the light-receiving unit is decreased. Thus, the collision of the vehicle can be detected.

On the other hand, a pedestrian is to be discriminated from other obstacles to be protected in the collision with the bumper of the vehicle. As described in JP-11-028994A, the pedestrian is distinguished based on a continuation time when the collision load (or deformation amount) exceeds a predetermined level. According to JP-11-310095A, the pedestrian is distinguished based on an increase rate of the collision load when the collision load exceeds a predetermined value. Moreover, referring to other art, the pedestrian is distinguished based on a peak value of the collision load. That is, according to these related arts, the pedestrian is discriminated from the other objects based on a predetermined variation component of a waveform of the collision load. In these cases, the collision load is to be corrected with respect to a velocity of the vehicle.

However, according to the device described in JP-2004-212281A, the tension of the wire which is arranged at the front side of the bumper reinforce member varies with time due to the stretch of the wire, so that a large detection error will be caused. In JP-2004-156945A, it is difficult to detect the value of the collision load, although the collision can be detected. According to JP-7-190732A, because the deformation of the front bumper is varied responding to a diversity of the collision, the deformation of the optical leakage fiber is various. Thus, it is difficult to appropriately detect the collision load although the collision can be detected.

In order to detect the collision load, a collision load sensor such as a strain gauge and an acceleration sensor, which output signals corresponding to the load, can be attached to the front surface of the bumper or the bumper reinforce member. Because the bumper extends in the vehicle width direction, it is difficult to appropriately detect the collision load exerted at the each part of the bumper. This problem may be solved by an arrangement of the multiple collision load sensors, which are disposed at the front surface of the bumper reinforce member and spaced from each other by a small gap in the vehicle width direction. However, because the manufacture cost is heightened to exceed the upper limit thereof, this method is practically impossible.

SUMMARY OF THE INVENTION

In view of the above-described disadvantage, it is an object of the present invention to provide a collision detection system for a vehicle, which appropriately detects a collision load exerted at a bumper of the vehicle and has a simple and utility construction.

According to the present invention, a collision detection system is provided for a vehicle, which has a pair of side members and a bumper reinforce member facing front end surfaces of the side members and extending in a substantial vehicle-width direction. The side members are spaced from each other at a predetermined distance in the vehicle width direction, and extend in a vehicle front-rear direction. The collision detection system includes at least one collision load detection unit for outputting signals corresponding to a collision load exerted at a bumper of the vehicle when an obstacle collides with the bumper, and a control unit for processing the signals from the collision load detection unit. The bumper is positioned at a vehicle front side of the bumper reinforce member. The collision load detection unit is disposed between a rear end surface of the bumper reinforce member and the front end surface of the side member, so that the collision load which is transmitted from the bumper sequentially to the bumper reinforce member and the collision load detection unit is detected.

In this case, the collision load detection unit is disposed at the front side of the side member. Therefore, the collision load which occurs at any position of the vehicle width direction of the bumper can be transmitted to the collision load detection unit through the bumper reinforce member, which is a rigid body disposed at the immediately rear side of the bumper. Accordingly, the collision load can be appropriately detected by the collision detection system having a simple and utility construction. Thus, an obstacle discrimination and the like by using the detection valve of the collision detection system can be improved.

Preferably, at least one collision load bypass member is arranged between the rear end surface of the bumper reinforce member and the front end surface of the side member, and positioned parallel to the collision load detection unit. A part of the collision load transmitted from the bumper to the bumper reinforce member is transmitted to the side member through the collision load bypass member to bypass the collision load sensor.

Accordingly, a load having a preferable value can be distributed and exerted at the collision load detection unit. Thus, the collision load detection unit can be protected from a damage due to an excessively collision load.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

Figure 1:
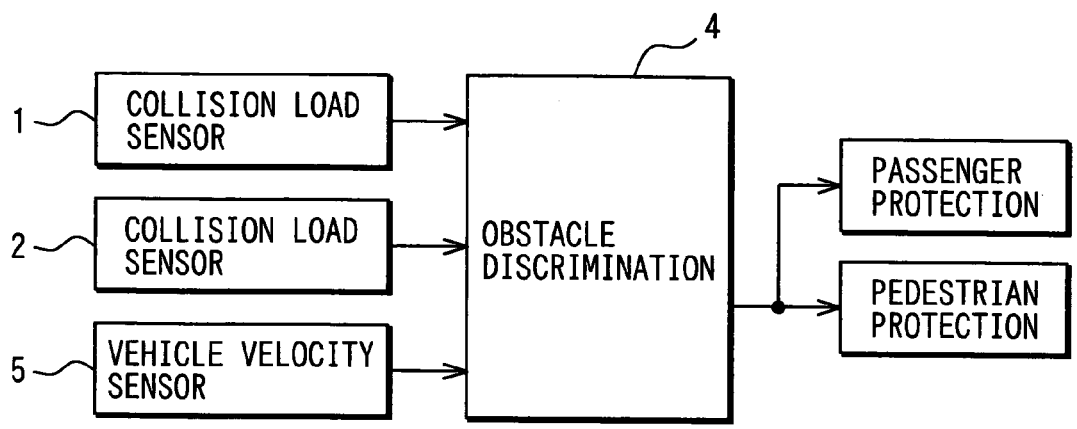
FIG. 1 is a block diagram showing a collision detection system according to a first embodiment of the present invention.
Figure 2:
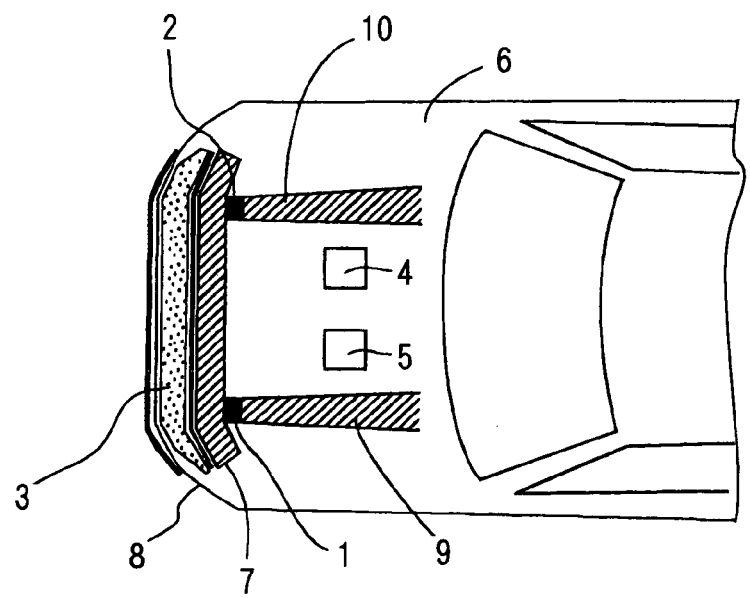
FIG. 2 is a plan view of the collision detection system according to the first embodiment.

According to a first embodiment of the present invention, a collision detection system for a vehicle is suitably used to detect a collision load exerted at a bumper of the vehicle when an obstacle collides with the vehicle. Referring to FIG. 1, the collision detection system has two collision load detection units 1 and 2 (e.g., collision load sensors) for outputting signals corresponding to the collision load, a control unit 4 (e.g., signal processing circuit) for processing signals output by the collision load detection units 1 and 2, and the like.

The collision detection system is mounted between a bumper reinforce member 7 and side members 9, 10 of the vehicle. The bumper reinforce member 7 is positioned at a vehicle rear side of the bumper. The bumper includes a bumper cover 8 and a bumper absorber 3, which extend substantially in a vehicle width direction. The bumper cover 8 is positioned at a front end of the vehicle and fixed to a vehicle chassis 6. The bumper absorber 3 is attached to a front surface (at vehicle front side) of the bumper reinforce member 7 disposed in the bumper cover 8.

The collision load sensors 1 and 2 are respectively attached to front ends of the two side members 9 and 10. The side members 9 and 10 extending in a vehicle longitudinal direction (i.e., front-rear direction) are arranged at a lower portion of the vehicle. A predetermined distance in the vehicle width direction is provided between the side members 9 and 10. The bumper reinforce member 7 extending substantially in the vehicle width direction is disposed at a front side of the collision load sensors 1 and 2. The bumper reinforce member 7 and the bumper absorber 3 are covered by the bumper cover 8.

Figure 3:
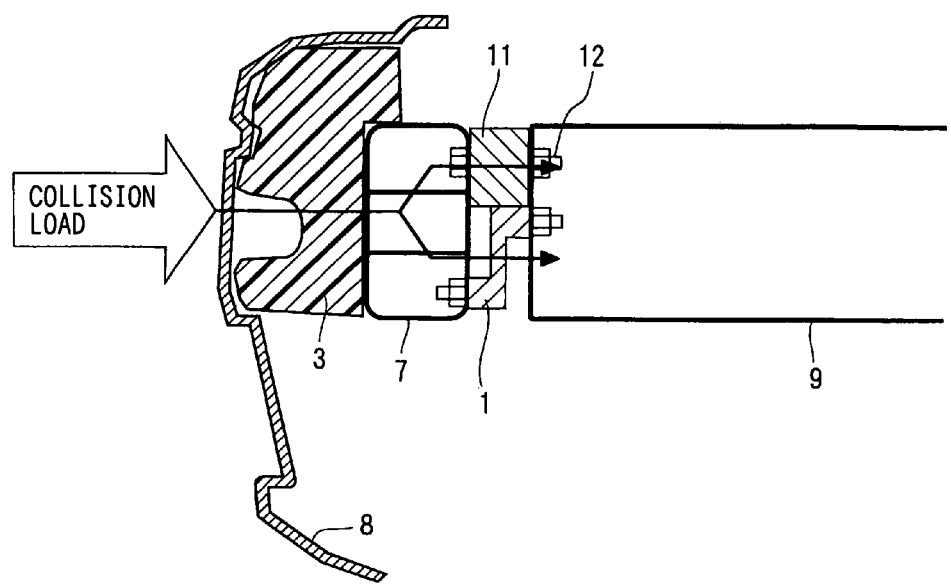
FIG. 3 is a schematic longitudinal sectional view showing the collision detection system according to the first embodiment.

According to this embodiment, referring to FIG. 3, two collision load bypass members 11 are respectively sandwiched between the rear end surface of the bumper reinforce member 7 and the front end surfaces of the side members 9 and 10. An upper portion of the rear end surface of the bumper reinforce member 7 is attached to an upper portion of the front end surfaces of the side member 9, for example, through a fastening unit 12 (e.g., bolt). The bolt 12 is inserted through penetration holes which respectively penetrate the frond end of the side member 9, the collision load bypass member 11 and the rear end of the bumper reinforce member 7, and engaged with nuts or the like to be fastened with a play. Similarly, the bumper reinforce member 7 is attached to the side member 10, and the other collision load bypass member 11 is arranged therebetween.

That is, the bumper reinforce member 7 and the collision load bypass members 11 are mounted at the side members 9 and 10 with a play, thus being movable in the vehicle front-rear direction. In this case, because a bending moment (due to weights of bumper reinforce member 7 and collision load bypass members 11) in the vehicle up-down direction is exerted at the bolt 12, the bolt 12 which is inserted through the penetration hole penetrating the collision load bypass member 11 can be supported by the collision load bypass member 11.

The collision load bypass member 11 is made of a metal, or a resin, or a hard rubber or the like. It is preferable that the collision load bypass member 11 is resiliently or plastically deformable. The collision load bypass member 11 can be constructed of a plate-shaped material or a block-shaped material, for example. Alternatively, the collision load bypass member 11 can be also constructed of a small-stiffness plate portion and a large-stiffness plate portion to have a sandwich structure.

The collision load sensor 1, 2, which is mounted between the rear end surface of the bumper reinforce member 7 and the front end surface of the side member 9, 10, is disposed at a lower side of the collision load bypass member 11. The collision load sensor 1, 2 can be constructed of a strain gauge (not shown) adhered to a surface of a middle portion of a metal plate, which has a crank-shaped longitudinal cross section, referring to FIG. 3. An upper portion and a lower portion of the collision load sensor 1, 2 can be arranged substantially perpendicularly to the middle portion thereof, to construct the crank shape, for example.

The upper portion of the collision load sensor 1 is fastened to (engaged with) the front end surface of the side member 9. For example, the collision load sensor 1 can be provided with a screw portion, which protrudes from a rear surface of the upper portion of the collision load sensor 1 toward the vehicle rear side (i.e., side of side member 9). The screw portion is inserted through a hole formed at the front end surface (e.g., at substantial center thereof) of the side member 9, and fastened to the front end surface through a nut or the like. Similarly, a front surface of the lower portion of the collision load sensor 1 is fastened to (engaged with) the lower side of the rear end surface of the bumper reinforce member 7.

In this case, the middle portion (vehicle up-down direction) of the collision load sensor 1 is arranged without contacting the bumper reinforce member 7 and the side member 9.

The collision load sensor 2 which is not shown in FIG. 3 is fastened to the side member 10 and the bumper reinforce member 7 in the same means with the collision load sensor 1.

According to this embodiment, the collision load due to the collision of the obstacle with the bumper is transmitted from the bumper cover 8 sequentially to the bumper absorber 3 and the bumper reinforce member 7, to be distributed (decentralized) to the collision load bypass members 11 and the collision load sensor 1, 2 which is positioned parallel to the collision load bypass member 11.

When the obstacle collides with the bumper, the lower portion (at lower side of middle portion thereof) of the collision load sensor 1 is deformed toward the vehicle rear side to exert a stress at the strain gauge which is adhered to the middle portion of the collision load sensor 1. Therefore, the resistance of the strain gauge is changed. Thus, the collision load can be determined by a detection of the resistance variation of the strain gauge.

Specifically, the control unit 4 (e.g., microcomputer-typed device) adds up the detection values of the collision load sensors 1 and 2, to determine the collision load exerted on the bumper. The control unit 4 can further sort-distinguish the obstacle according to the collision load and a detection value of a vehicle velocity sensor 5 for detecting a velocity of the vehicle. In the case where it is determined that the obstacle is a pedestrian, a pedestrian protection device (e.g., pedestrian-protecting airbag and hood-lifting apparatus) is activated. Moreover, in the case where the collision load is large, a passenger protection device (e.g., passenger-protecting airbag) is activated.

As described above, the collision load bypass member 11 is arranged at the upper side of the collision load sensor 1, 2. The collision load bypass member 11 can be also disposed at other positions between the bumper reinforce member 7 and the side member 9, 10 to be parallel to the collision load sensor 1, 2, so that a part of the collision load bypasses the collision load sensor 1, 2. For example, the collision load bypass member 11 can be also positioned at the lower side of the collision load sensor 1, 2. Alternatively, the collision load bypass member 11 can be also positioned at a right side or a left side of the collision load sensor 1, 2 in the vehicle width direction. More alternatively, the collision load bypass member 11 can be also provided with a concave portion having an opening facing the vehicle front side. The collision load sensor 1, 2 is arranged in the concave portion.

According to this embodiment, a part of the collision load which is transmitted from the bumper reinforce member 7 is exerted at the collision load sensors 1 and 2, so that damage (due to excessively large collision load) of the collision load sensors 1 and 2 can be restricted.

Second Embodiment

Figure 4:
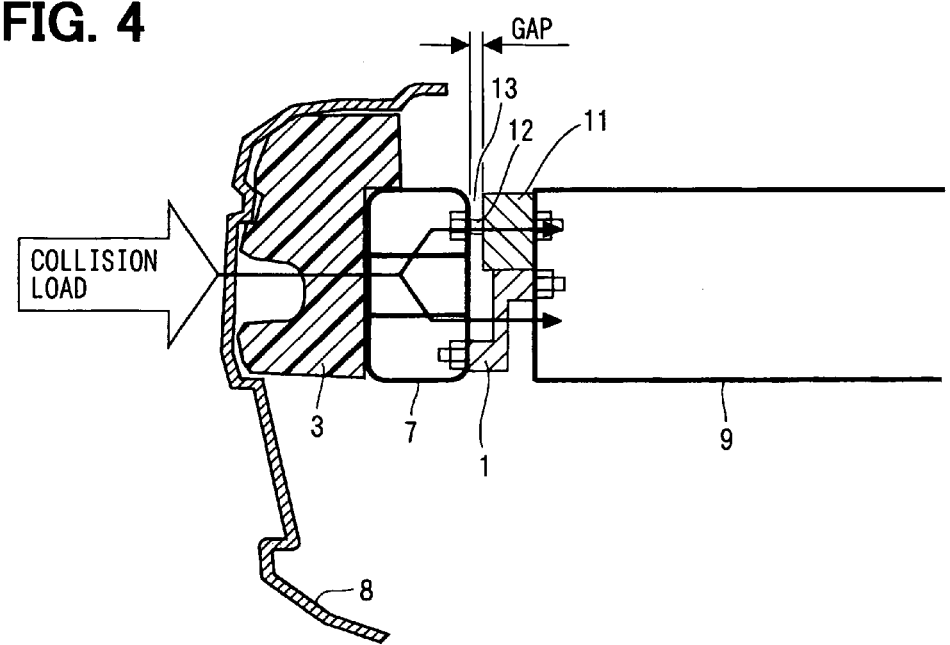
FIG. 4 is a schematic longitudinal sectional view showing a collision detection system according to a second embodiment of the present invention.

According to a second embodiment of the present invention, referring to FIG. 4, a gap 13 (without being provided in above-described first embodiment) is arranged between the rear end surface of the bumper reinforce member 7 and the collision load bypass member 11 to admit a position variation (including displacement and deformation) of the bumper reinforce member 7 toward the vehicle rear side.

According to this embodiment, the bolt 12 is inserted through the penetration holes which are respectively formed at the frond end of the side member 9 (or 10), the collision load bypass member 11 and the rear end of the bumper reinforce member 7, and engaged with the nuts or the like to be fastened with a play. In this case, the rear end surface of the collision load bypass member 11 contacts the front end surface of the side member 9 (or 10), while the gap 13 is arranged between a front end surface of the collision load bypass member 11 and the rear end surface of the bumper reinforce member 7.

The length (of vehicle front-rear direction) of the gap 13 is set to correspond to the deformation capacity (of vehicle front-rear direction) of the collision load sensor 1, 2.

In this case, a gap-maintaining member can be also arranged at the gap 13. The gap-maintaining member can be constructed of a coil spring, a dish spring or the like to be easily deformable, thus maintaining the gap 13 when no collision occurs. The gap-maintaining member is constructed to admit the position variation (including displacement and deformation) of the bumper reinforce member 7 toward the vehicle rear side when the obstacle (e.g., pedestrian) having a velocity in a predetermined range collides with the bumper.

Figure 5:
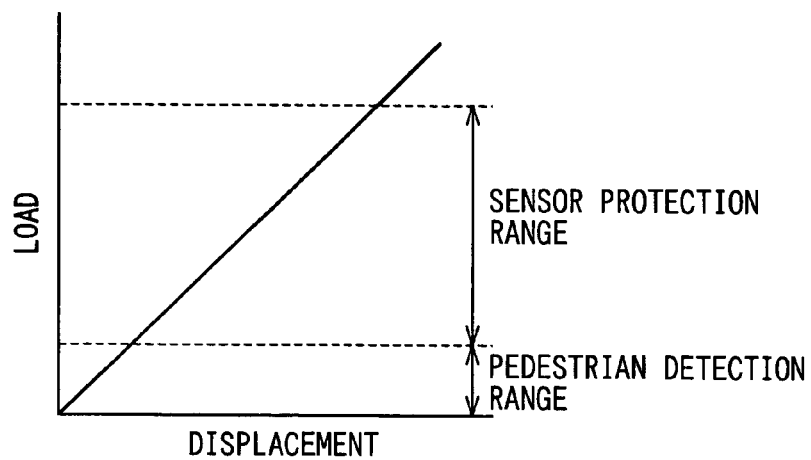
FIG. 5 is a graph showing an output characteristic of a collision load sensor in the collision detection system where there is no gap between a bumper reinforce member and a collision load bypass member according to the first embodiment.
Figure 6:
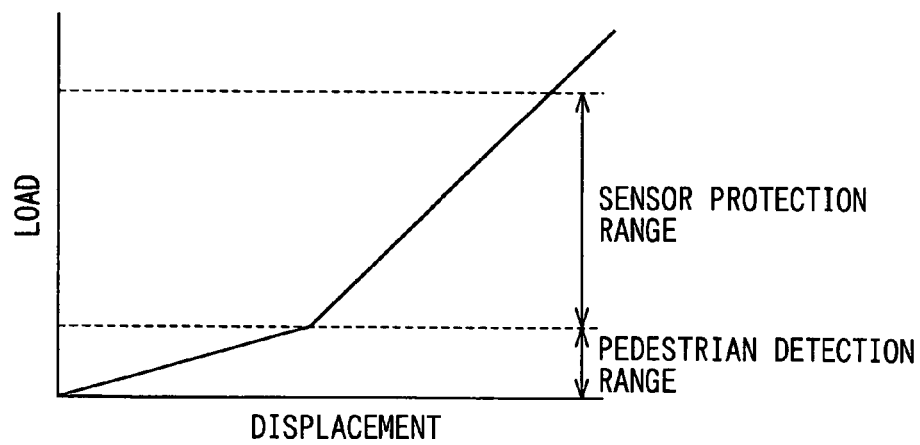
FIG. 6 is a graph showing an output characteristic of a collision load sensor in the collision detection system where a gap is provided between a bumper reinforce member and a collision load bypass member according to the second embodiment.

According to the second embodiment, when the collision load toward the vehicle rear side is applied to the bumper cover 8, the bumper reinforce member 7 is displaced in the gap 13 in the case where the collision load is relatively small (corresponding to pedestrian detection range in FIG. 6 or 5). Responding to the displacement of the bumper reinforce member 7, the collision load sensor 1, 2 is deformed to have a displacement, thus outputting a signal voltage corresponding to the collision load.

In the case where the collision load is excessively large (corresponding to sensor protection range in FIG. 6 or 5) so that the displacement of the bumper reinforce member 7 exceeds the length of the gap 13 or the deformation amount of the gap-maintaining member is equal to the maximum value thereof, the collision load is transmitted to the collision load bypass member 11. Thus, the most of the collision load bypasses the collision load sensor 1, 2 through the collision load bypass member 11, so that damage of the collision load sensor 1, 2 can be restricted.

FIG. 5 shows the characteristic of the collision load senor 1, 2 according to the first embodiment, in which there is no gap between the collision load bypass member 11 and the bumper reinforce member 7. In contrast to this, FIG. 6 shows the characteristic of the collision load senor 1, 2 according to the second embodiment, in which the gap 13 is arranged between the collision load bypass member 11 and the bumper reinforce member 7. Referring to FIG. 6, the detection performance of the collision load sensor 1, 2 is improved as compared with that shown in FIG. 5.

In the case where the gap 13 is provided between the bumper reinforce member 7 and the collision load bypass member 11 which is arranged parallel to the collision load sensor 1, 2, most of the force toward the vehicle rear side transmitted from the bumper to the bumper reinforce member 7 is exerted at the collision load sensor 1, 2 and the bumper reinforce member 7 is easily displaced toward the vehicle rear side when the collision load is relatively small. Thus, the pedestrian detection range where the collision load can be detected with a high accuracy is enlarged. Therefore, according to the second embodiment, the collision load bypass member 11 is spaced from the bumper reinforce member 7 by the gap 13, so that the bumper reinforce member 7 is more easily displaced toward the vehicle rear side. Thus, the detection performance of the collision load sensor 1, 2 is improved.

On the other hand, in the case where the collision load is excessively large (that is, corresponding to the sensor protection rang) so that the collision load sensor 1, 2 is to be protected from the impact, the collision load can bypass the collision load sensor 1, 2 through the collision load bypass member 11. Thus, the damage of the collision load sensor 1, 2 can be reduced. Moreover, in this case, the dynamical detectable range of the collision load can be enlarged.

Third Embodiment

Figure 7:
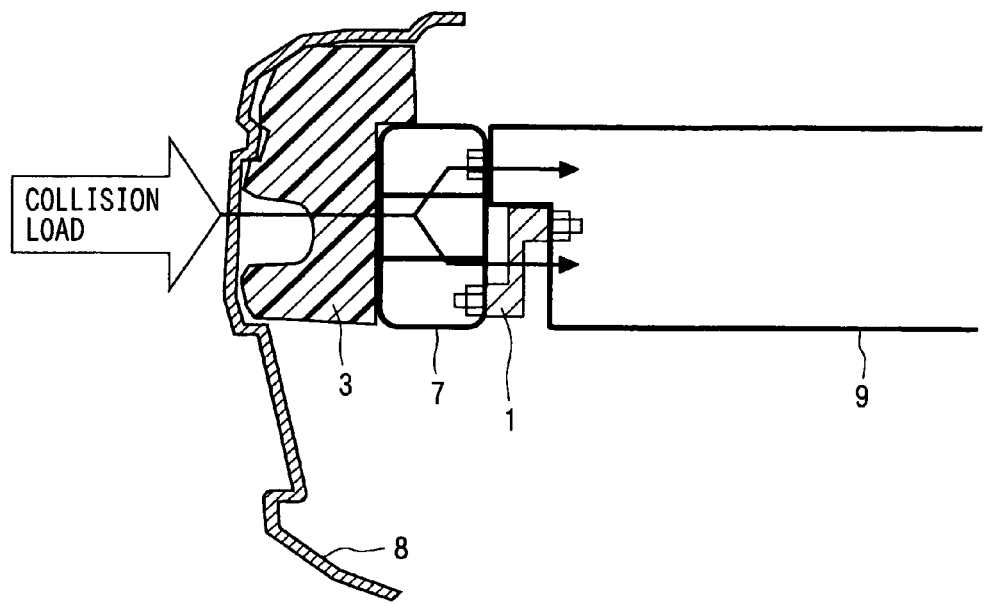
FIG. 7 is a schematic longitudinal sectional view showing a collision detection system according to a third embodiment of the present invention.

A third embodiment of the present invention will be described referring to FIG. 7. In this case, one part (e.g., upper portion) of the front end of the side member 9, 10 protrudes toward the vehicle front side with respect to other part (e.g., lower portion) thereof, to be used as the collision load bypass member 11. In this case, the one part of the front end of the side member 9, 10 can be arranged to contact the bumper reinforce member 7, or spaced from it by the gap 13 (referring to the second embodiment) where the gap-maintaining member can be provided.

Alternatively, one part (e.g., upper portion) of the rear end of the bumper reinforce member 7 can also protrude toward the vehicle rear side with respect to other part (e.g., lower portion) thereof, to be used as the collision load bypass member 11. In this case, the one part of the rear end of the bumper reinforce member 7 can be arranged to contact the side member 9, 10, or spaced from it by the gap 13 (referring to the second embodiment) where the gap-maintaining member can be provided.

Fourth Embodiment

Figure 8:
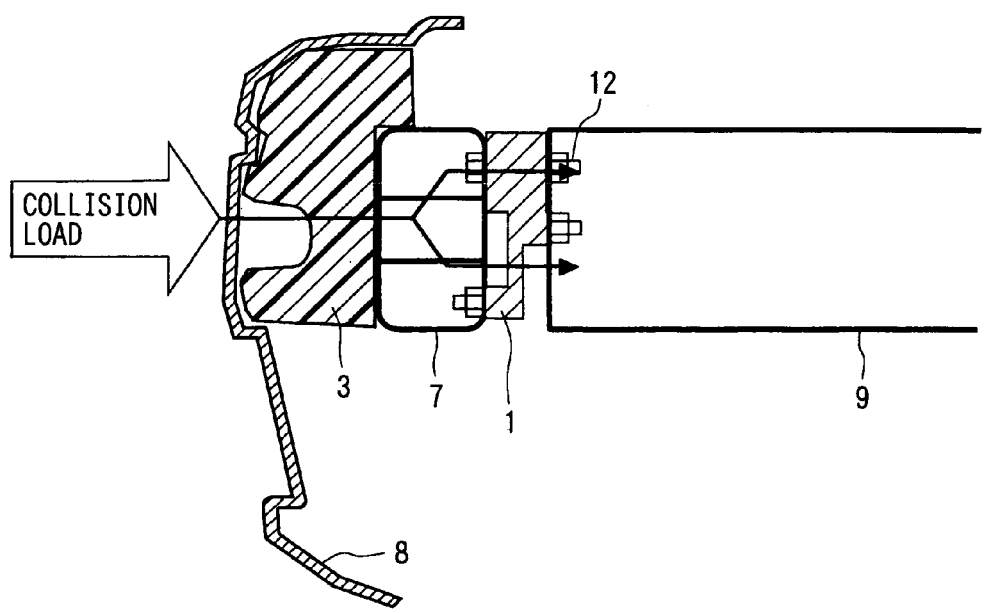
FIG. 8 is a schematic longitudinal sectional view showing a collision detection system according to a fourth embodiment of the present invention.

A fourth embodiment of the present invention will be described referring to FIG. 8. In this case, the collision load sensor 1, 2 having the metal plate with the crank-shaped longitudinal cross section is integrated with the collision load bypass member 11. The gap 13 described in the second embodiment can be also arranged between the bumper reinforce member 7 and the collision load bypass member 11. Moreover, the gap-maintaining member can be also provided in the gap 13.

Fifth Embodiment

Figure 9:
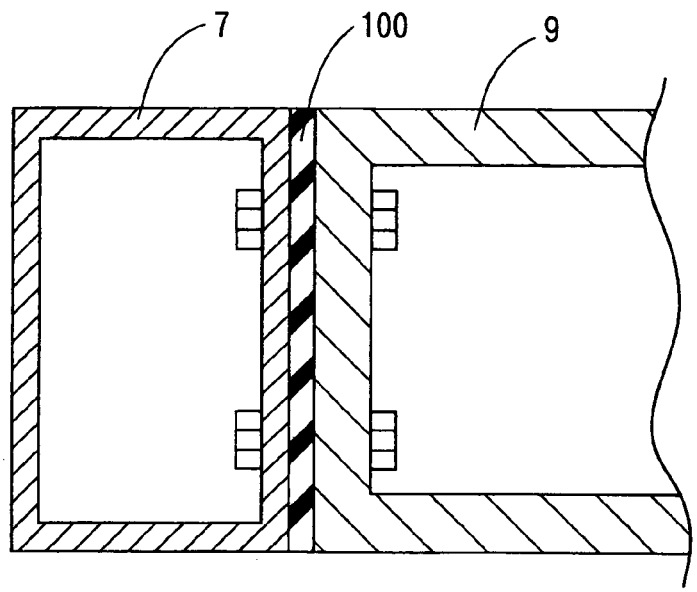
FIG. 9 is a schematic longitudinal sectional view showing a collision detection system according to a fifth embodiment of the present invention.
Figure 10:
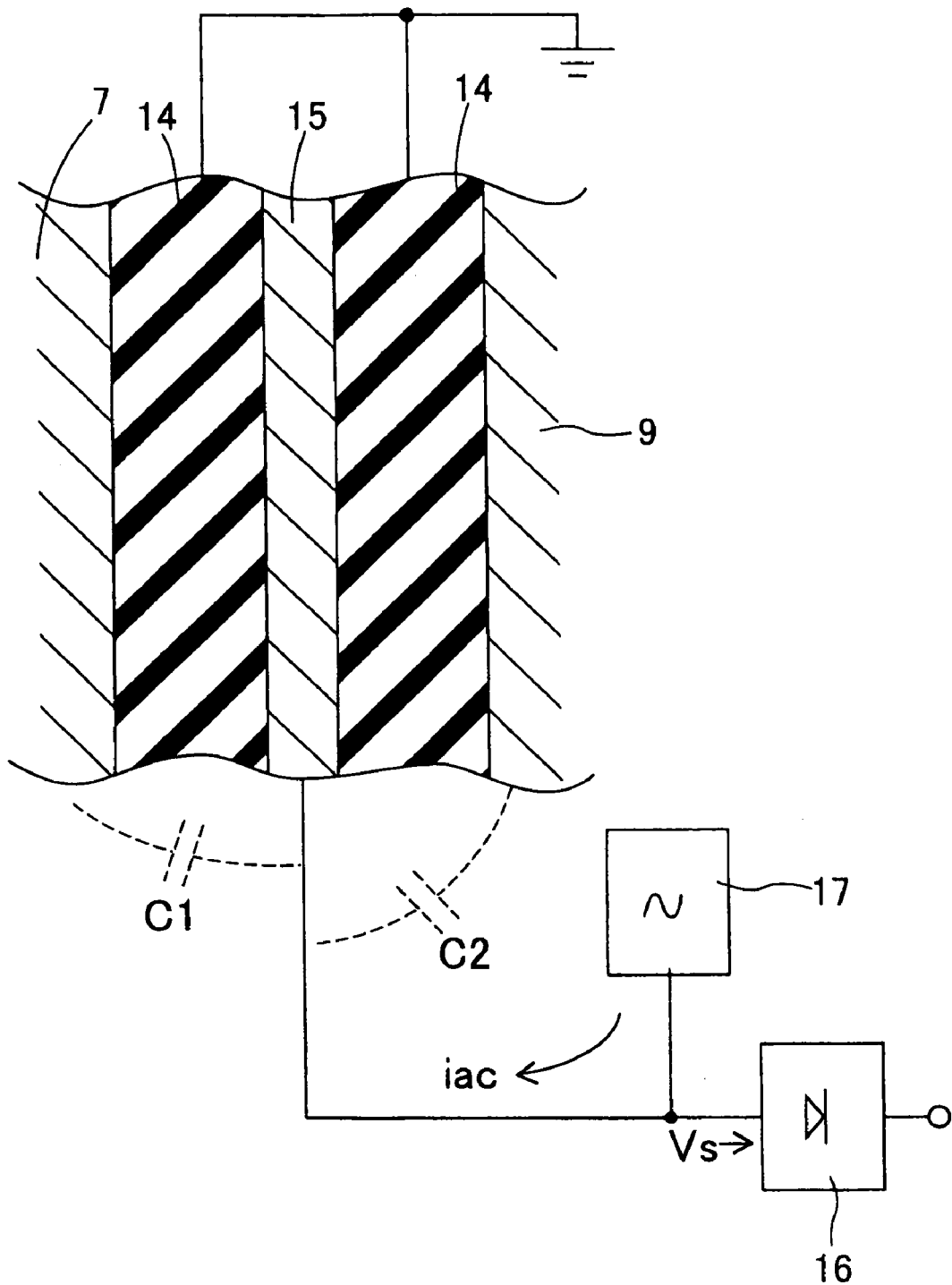
FIG. 10 is a partially enlarged sectional view of FIG. 9.

A fifth embodiment of the present invention will be described referring to FIG. 9. In this case, a collision load sensor 1, 2 of a type different from that described in the above-described embodiments is arranged between the bumper reinforce member 7 and the side member 9, 10. FIG. 10 shows an enlarged longitudinal cross-sectional view of the collision load sensor 1. The collision load sensor 2 has the same construction with the collision load sensor 1.

According to the fifth embodiment, the collision load sensor 1 includes a rubber plate 14 and a metal-plate electrode 15. The metal-plate electrode 15 is positioned in the rubber plate 14 at a substantial center (of vehicle front-rear direction) of the rubber plate 14. The metal-plate electrode 15 can extend in the vehicle up-down direction, for example. The bumper reinforce member 7 and the side member 9 are electrically grounded. Thus, a capacitance C1 (with respect to ground) between the metal-plate electrode 15 and the bumper reinforce member 7, and a capacitance C2 (with respect to ground) between the metal-plate electrode 15 and the side member 9 (or 10) are formed.

The metal-plate electrode 15 is power-supplied by an AC power source 17 (e.g., constant-current AC power source) having a predetermined output impedance. Referring to FIG. 10, the arrow 'iac' indicates alternating current provided for the metal-plate electrode 15 by the AC power source 17.

When a collision load toward the vehicle rear side is applied to the bumper reinforce member 7 so that the rubber plate 14 of the collision load sensor 1 (or 2) is compressed in the vehicle front-rear direction, the capacitances C1 and C2 of the metal-plate electrode 15 are increased. Therefore, the output voltage Vs of the collision load sensor 1 (or 2) is decreased. Signals corresponding to the collision load can be obtained by rectifying the output voltage Vs through a processing circuit 16.

Alternately, a film-like pressure-sensitive sensor can be also used instead of this collision load sensor 1, 2. The film-like pressure-sensitive sensor can be a pressure-sensitive conductive rubber sensor vulcanization-formed by rubber in which conductive particles are mixed, or a pressure-sensitive conductive ink sensor, in which paste, gel or the like including conductive ink is sandwiched by a pair of electrodes. In the film-like pressure-sensitive sensor, the electrical resistance value between the electrodes will vary due to the collision load.

As described above, the condition unit 4 adds up the detection values of the collision load sensors 1 and 2, to determine the collision load exerted at the bumper. The detected collision load can be used for an obstacle discrimination, for example. In this case, a pedestrian is discriminated from other obstacle colliding with the vehicle, according to whether or not the collision load adjusted based on the vehicle velocity is within a predetermined threshold range.

Figure 11:
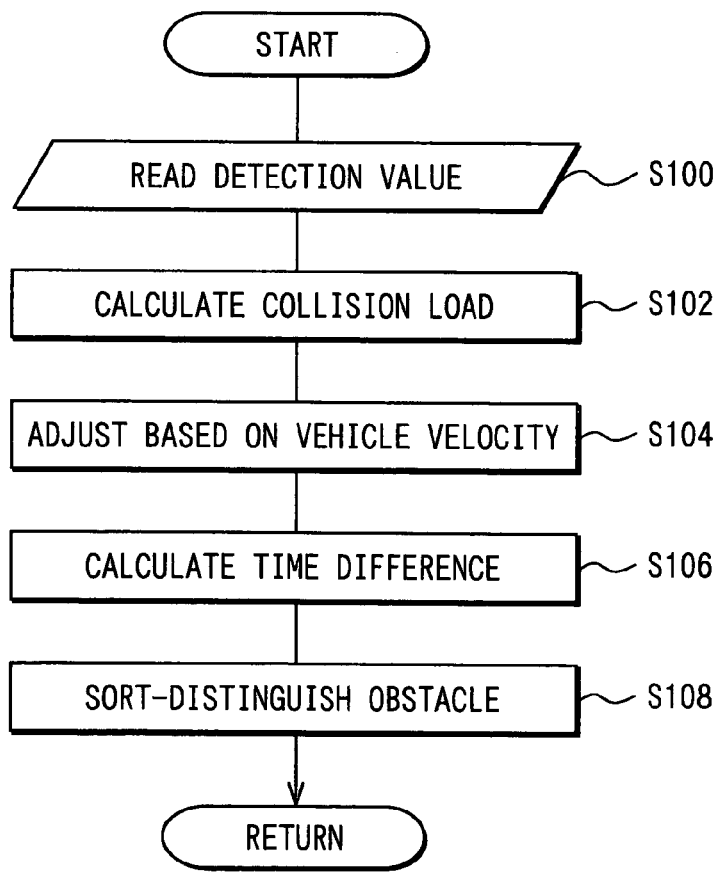
FIG. 11 is a flow chart showing a process of detection values of the collision detection system according to the present invention.

FIG. 11 shows an obstacle sort-distinguishing procedure performed by the control unit 4 when an obstacle collides with the bumper of the vehicle. At first, at step S100, the detection values of the collision load sensors 1 and 2 are read in and converted into the load values based on a beforehand-memorized relation. At step S102, the control unit 4 adds up the load values to calculate the collision load exerted at the bumper. Then, at step S104, the mass of the obstacle is calculated based on the collision load and the velocity (detected by vehicle velocity sensor 5) of the vehicle when colliding.

At step S106, the difference between start-up times (i.e., time spent in varying from initial value to peak value) of waveforms of the collision load sensors 1 and 2 is calculated. According to the difference between the start-up times, the collision position of the vehicle right-left direction of the obstacle can be determined. For example, when the obstacle collides with the bumper at the immediately front side of the side member 9, the most of the collision load is transmitted to the collision load sensor 1 attached to the side member 9. A part of the collision load is transmitted to the collision load sensor 2. Therefore, the waveform of the collision load sensor 2 has a relatively small amplitude and a later start-up time, as compared with the collision load sensor 1. Thus, the collision position of the obstacle can be determined.

At step 108, it is determined whether or not the mass calculated at S104 is in a beforehand-memorized mass range of the human being (pedestrian). In the case where the mass calculated at S104 is in the beforehand-memorized mass range, it is determined that the obstacle is the pedestrian. When a predetermined period passes after S108, the procedure will be repeated from the S100.

Other Embodiment

Although the present invention has been fully described in connection with the preferred embodiments thereof with reference to the accompanying drawings, it is to be noted that various changes and modifications will become apparent to those skilled in the art.

In the above-described first-fourth embodiments, the single collision load bypass member 11 is provided between the bumper reinforce member 7 and each of the side members 9 and 10. However, the multiple collision load bypass members 11 can be also arranged between the bumper reinforce member 7 and each of the side members 9 and 10, and disposed parallel to the collision load sensor 1 (or 2).

Moreover, the collision load sensor 1, 2 can be also constructed of one of an optical fiber sensor, a pressure sensor, an acceleration sensor and the like. Alternately, the collision load sensor 1, 2 can be also constructed to directly detect the distance between the rear end surface of the bumper reinforce member 7 and the front end surface of the side member 9 (or 10), by a detection of the capacitance therebetween and a conversion of the double of the distance into a go-return time of ultrasound.

Such changes and modifications are to be understood as being in the scope of the present invention as defined by the appended claims.

What is claimed is:

1. A collision detection system for a vehicle, which has a pair of side members and a bumper reinforce member facing front end surfaces of the side members and extending in a vehicle-width direction, the side members being spaced from each other at a predetermined distance in the vehicle-width direction and extending in a vehicle front-rear direction, the collision detection system comprising:
   at least one collision load detection unit for outputting signals corresponding to a collision load exerted at a bumper of the vehicle when an obstacle collides with the bumper, the bumper being positioned at a vehicle front side of the bumper reinforce member;
   a control unit for processing the signals from the collision load detection unit; and
   at least one collision load bypass member, which is arranged between the rear end surface of the bumper reinforce member and the front end surface of the side member and positioned parallel to the collision load detection unit, wherein
   the collision load detection unit is disposed between a rear end surface of the bumper reinforce member and the front end surface of the side member, so that the collision load which is transmitted from the bumper sequentially to the bumper reinforce member and the collision load detection unit is detected, and
   a part of the collision load transmitted from the bumper to the bumper reinforce member is transmitted to the side member through the collision load bypass member, to bypass the collision load detection unit.

2. The collision detection system according to claim 1, wherein
   a gap having a predetermined length in the vehicle front-rear direction is arranged between the collision load bypass member and at least one of the bumper reinforce member and the side member, to admit a position variation of the bumper reinforce member toward a vehicle rear side due to the collision load.

3. The collision detection system according to claim 1, wherein:
   a plurality of the collision load bypass members are arranged between the rear end surface of the bumper reinforce member and the front end surface of the side member; and
   a gap baying a predetermined length in the vehicle front-rear direction is arranged between the adjacent collision load bypass members, to admit a position variation of the bumper reinforce member toward a vehicle rear side due to the collision load.

4. The collision detection system according to claim 1, wherein:
   the two collision load detection units are respectively positioned between the rear end surface of the bumper reinforce member and the front end surfaces of the two side members; and
   the control unit sort and distinguishes the obstacle based on a sum of the signals from the two collision load detection units.

5. The collision detection system according to claim 1, wherein
   the collision load bypass member includes a concave portion having an opening facing the vehicle front side, the collision load detection unit being arranged in the concave portion.

6. The collision detection system according to claim 1, wherein the collision load bypass member is made of one of a metal, a resin and a hard rubber.

7. The collision detection system according to claim 1, wherein
   the collision load bypass member is one part of a front end of the side member, the one part protruding toward the vehicle front side with respect to other part of the front end of the side member.

8. The collision detection system according to claim 1, wherein
   the collision load bypass member is one part of a rear end of the bumper reinforce member, the one part protruding toward the vehicle rear side with respect to other part of the rear end of the bumper reinforce member.

9. The collision detection system according to claim 1, wherein the collision load detection unit is integrated with the collision load bypass member.

* * * * *